United States Patent [19]

Patel et al.

[11] Patent Number: 5,145,926

[45] Date of Patent: Sep. 8, 1992

[54] POLY(INDANE ETHERS)

[75] Inventors: Kundan M. Patel, Landing; Frank Mares, Whippany, both of N.J.

[73] Assignee: Allied-Signal Inc., Morristown, N.J.

[21] Appl. No.: 499,247

[22] Filed: Mar. 26, 1990

[51] Int. Cl.$^5$ .................. C08F 136/00; C08F 116/12; C08G 65/34

[52] U.S. Cl. ................................ 526/284; 526/333; 526/334; 528/425

[58] Field of Search ............... 526/284, 333, 334, 257, 526/259, 260, 261

[56] References Cited

U.S. PATENT DOCUMENTS 3,634,089  1/1972  Hamb ..................................... 96/87
4,175,175  5/1978  Johnson .............................. 528/125
4,205,160  3/1976  Gloth .................................. 528/425

OTHER PUBLICATIONS

Virgil Percec and Jeanne Marie Tingerthal, Synthesis of Aromatic Polyethers Containing 2,6(7)-Dihydroxy [1,3,5(6),7(8)-tetramethylanthracene] units, Journal of Polymer Science, Polymer Chemistry Section, vol. 25, 2577-2583 (1987).

Virgil Percec and Hildeberto Nava, Synthesis of Aromatic Polyethers by Scholl Reaction. I. Poly(1,-1'-Dinaphthyl Ether Phenyl Sulfone)s and Poly(1,-1'-Dianphthyl Ether Phenyl Ketone)s, Journal of Polymer Science: Polymer Chemistry Section, vol. 26, 783-805 (1988).

John C. Wilson, "Polyamides and Polyesters Derived from 1,1,3-Trimethyl-3-(p-aminophenyl)-5-indanamine and 1,1,3-Trimethyl-3-(p-hydroxyphenyl)-5-indanol" Jrl. of Polymer Science, 13, (1975) 749-754.

Primary Examiner—Joseph L. Schofer
Assistant Examiner—Wu C. Cheng
Attorney, Agent, or Firm—R. C. Stewart, II; G. H. Fuchs; D. L. Webster

[57] ABSTRACT

This invention relates to poly(aryl indane) polymers.

20 Claims, No Drawings

POLY(INDANE ETHERS)

BACKGROUND OF THE INVENTION

1. Field of the Invention

This invention relates to novel indane based polymers. More particularly, this invention relates to novel polyaryl indanes.

2. Prior Art

Indane based polymers are known. For example, U.S. Pat. No. 3,634,089 various polyesters of 1,1,3-trialkyl-5-carboxy-3-(p-carboxyphenyl) bis-phenols. These polymers are described as film forming and having high heat distortion temperatures and good optical clarity.

U.S. Pat. No. 4,205,160 describes terpolymers containing from 20% to 100% of 1,1,3-trimethyl-3-phenyl indane and the remaining recurring units of 2,4-diphenyl-4-methyl-2-pentene and 2,4-diphenyl-4-methyl-1-pentene. The polymers are disclosed as being useful as lubricants and molding aids for crystallizable polyester resins, especially polyethylene terephthalate.

Wilson, John C., *Journal of Polymer Science: Polymer Chemistry Edition*. "Polyamides and Polyesters derived from 1,1,3-Trimethyl-3-(p-aminophenyl)-5-indanamine and 1,1,3-Trimethyl-3-(p-hydroxyphenyl)-5-indanol", Polymer Chemistry Edition, Vol. 13, pp. 749-754 (1975), describes the preparation and characterization of various indane based polyamides and polyesters.

U.S. Pat. No. 4,175,175 describes various polyarylene polyethers. These polymers are described as exhibiting excellent strength and toughness properties and outstanding thermal, oxidative and chemical stability.

SUMMARY OF THE INVENTION

This invention is directed to polyether indanes having recurring units of the Formula I:

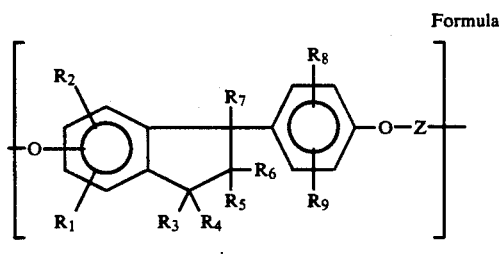

Formula I wherein:

—Z— is a divalent linking group which comprises one or more moieties selected from the group consisting of:

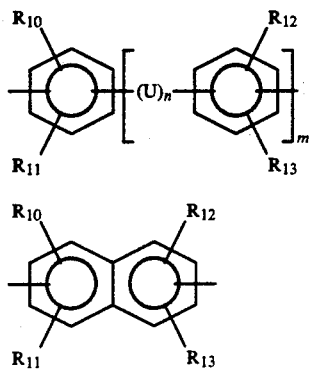

(a)

(b)

(c)

(d)

—$R^1$— is the same or different at each occurrence and is a moiety of the formula:

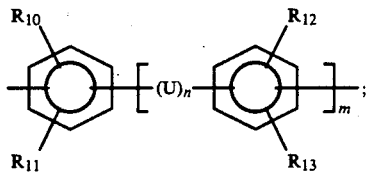

m is 0 or a whole number;
n is 0 or 1;
U is —O—, —S—, —S—S—, —$SO_2$—, —N=N—, —N($R_{16}$)—,

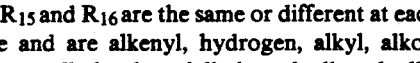

—C(O)N($R_{16}$)—, —SO—, —CO—, —C(O)O—,

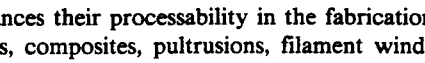

—OC(O)— or —[C($R_{14}$)($R_{15}$)]—; and $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$ and $R_{16}$ are the same or different at each occurrence and are alkenyl, hydrogen, alkyl, alkoxy, aryl, hydroxy, alkylaryl, arylalkyl, cycloalkenyl, alkoxyaryl, alkoxyalkyl, halogen, cyano, cycloalkyl, alkoxaryl, or aryloxy; or $R_{14}$ and $R_{15}$ together may form an alkylene or alkenylene chain completing a 3, 4, 5, 6, 7, 8, or 9 membered alicyclic or aromatic fused or bridged ring system, which system may optionally include one or more divalent carbonyl, sulfonyl, oxa, aza, alkylaza or arylaza groups.

The polymers of this invention are thermoplastic polymers which are soluble in various solvents which, enhances their processability in the fabrication of pre-pregs, composites, pultrusions, filament windings and the like. In addition, these polymers exhibit good mechanical properties especially at high temperatures high glass transition temperatures, good thermal stability and good toughness.

DESCRIPTION OF THE PREFERRED EMBODIMENTS

This invention relates to a novel polymer of the Formula I in which $R_1$, $R_2$, $R_3$, $R_4$, $R_5$, $R_6$, $R_7$, $R_8$, $R_9$, Z, $R_{12}$, $R_{13}$, $R_{14}$, $R_{15}$, $R_{10}$, $R_{11}$, $R_{16}$, —R—, and —U— are defined above.

Illustrative of useful Z moieties are those recurring ether sulfones, ether ketones, phenyleneethers, etherimides and the like. See for example Sukumar; Maiti and Braja K. Mandal, *Prog. Polvm. Sci.*, Vol. 12, pp. 111 to 153 (1986).

Illustrative of useful $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$ and $R_{15}$ substituents are hydrogen, alkyl such as methyl, ethyl, butyl, pentyl, octyl, nonyl, tert-butyl, neopentyl, isopropyl, sec-butyl, dodecyl and the like; alkoxy such as propoxy, butoxy, methoxy, isopropoxy, pentoxy, nonoxy, ethoxy, octyloxy and the like; cycloalkyl such as cyclohexyl, cyclooctyl, cycloheptyl, cyclopentyl and the like; alkoxyalkyl and phenoxyalkyl such phenoxymethylene, phenoxyethylene, methoxymethylene, ethoxymethylene, methoxymethylene, butoxymethylene, propoxyethylene, and the like; phenylalkyl such as phenethyl, phenylpropyl, benzyl and the like; and substituted alkyl and phenyl groups such cyanomethyl, 3-chloropropyl; and 3,4-dichlorophenyl, 3,4-dichoro-3-cyanophenyl, phenyl, a fluoromethyl, difluoromethyl, 4-nitrophneyl, phenoxyphenyl, 4-methylphenyl, 2,4-dimethylphenyl, 2-nitroethyl, nitromethyl, and the like.

Also illustrative of useful $R_{14}$ and $R_{15}$ groups are divalent moieties formed from $R_{14}$ and $R_{15}$ groups such as moieties of the formula:

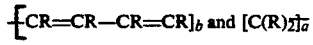

wherein a is an integer from about 3 to about 7, b is an integer from 1 to about 2 and R is the same or different at each occurrence and is hydrogen or alkyl as for example ${-}[CH_2]{-}_4$, ${-}[CH_2]{-}_3$, ${-}[CH{=}CH{-}CH{=}CH{-}]$, $-CH_2-CH(CH_3)-CH_2-$, ${-}[C(CH_3)H]{-}_3$ and ${-}[CH_2]{-}_5$ to form various hydrocarbon fused and bridged rings, or such moieties which optionally include divalent oxygen, nitrogen, ester, sulfonyl, carbonyl, disulfide, sulfenyl or sulfur such as $-CH_2SCH_2-$, $-CH_2N(H)CH_2-$, $-SCH_2NHCH_2-$, $-OCH_2SCH_2-$, $CH_2S(O_2)CH_2-$, $-CH_2S(O)CH_2$, $OC(O)CH_2CH_2-$, $-CH_2C(O)CH_2-$, $-CH_2OCH_2-$ and the like to form various heterocyclic fused and bridged rings.

Preferred polymers of this invention are those of Formula I wherein:

Z comprises one or more moieties of the formula:

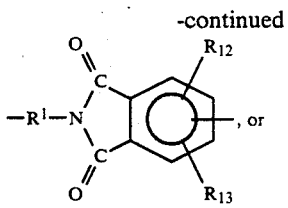

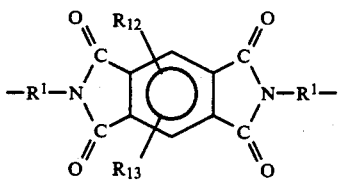

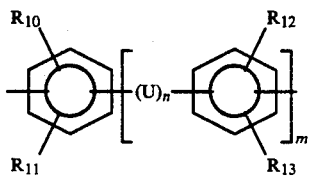

$-R^1-$ is the same or different at each occurrence and is a moiety of the formula:

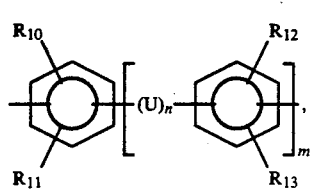

U is a moiety of the formula: $-O-$, $-SO_2-$, $-S-$, $-CO-$, or ${-}[C(R_{14})(R_{15})]{-}$; $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$ and $R_{15}$ are the same or different at each occurrence and are hydrogen, alkyl, or alkoxy having from 1 to about 10 carbon atoms, phenyl or alkylphenyl, phenylalkyl or alkoxyphenyl having from about 7 to about 17 carbon atoms, alkoxyalkyl having from 2 to about 10 carbon atoms, nitro, halogen, cyano, cyclohexyl or phenoxy.

Particularly preferred polymers of this invention are those of Formula I wherein:

Z comprises one or more moieties of the formula:

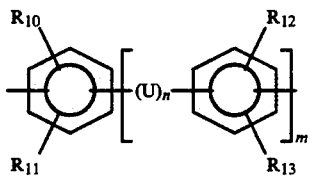

n is 0 or 1;
m is 1, 2, 3, 4, 5 or 6;
U is $-SO_2-$ or ${-}[C(R_{14})(R_{15})]{-}$; and
$R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$ and $R_{15}$ are the same or different at each occurrence and are hydrogens, phenyl or alkyl having from 1 to about 7 carbon atoms.

The most preferred polymers of this invention are those of Formula I wherein:
Z is a moiety of the formula:

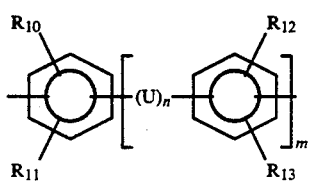

$n$ is 0 or 1;

$U$ is $-SO_2-$ or $-[C(R_{14})(R_{15})]-$; and $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$ and $R_{15}$ are the same or different at each occurrence and are hydrogen or alkyl having from 1 to about 4 carbons.

The molecular weight of the polymer of this invention may vary widely. In general, the number average molecular weight (M) of the polymer is at least about 1000. In the preferred embodiments of the invention, the number average molecular weight of the polymer is from about 1000 to about 1,000,000 and in the particularly preferred embodiments is from about 10,000 to about 200,000. In the most preferred embodiments of the invention, the number average molecular weight of the polymer is from about 20,000 to about 100,000.

The term number average molecular weight M as used herein is defined as follows:

$$Mn = \frac{\sum_{i=1}^{\infty} M_i N_i}{\sum_{i=1}^{\infty} N_i}$$

wherein the summation:

$$\sum_{i=1}^{\infty} N_i$$

represents the total number of molecules is a sample, $N_i$ represents the number of molecules of molecular weight $M_i$ and the summation:

$$\sum_{i=1}^{\infty} M_i N_i$$

represents the total weight of the sample.

The polymer of this invention can be conveniently prepared by a nucleophilic displacement condensation polymerization reaction. In this reaction, a equimolar amount of an appropriately substituted aromatic compound of the formula:

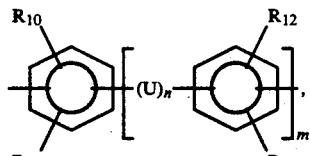
(a)

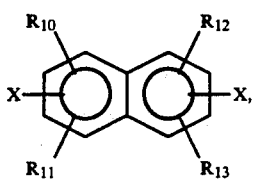
(b)

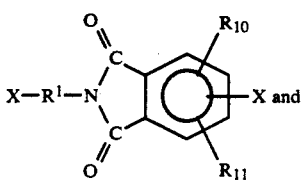
(c)

-continued

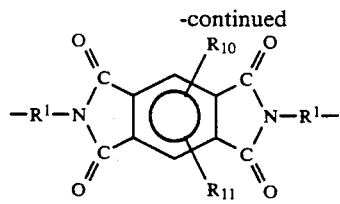
(d)

and an appropriately substituted indane compound of the formula:

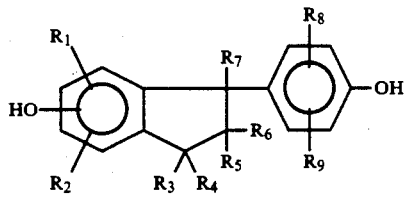

in an aprotic solvent and in the presence of a base wherein n, m, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $U$, and $Z$ are as defined above, and X is a leaving group such as chloro, fluoro, bromo, phenoxy, tosylate, mesitylate, tert-butoxy and the like.

Alternatively, the polymers of this invention can be conveniently prepared by the self condensation of a compound of the formula:

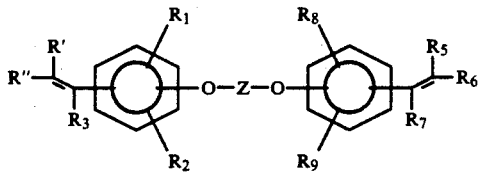

in an aprotic solvent and the presence of an acid catalyst, where $R_4$ is $-CR'R''$.

The processes are carried out in an aprotic polar solvent having a relatively high boiling point. Useful aprotic solvents may vary widely, the only requirements are that they are solvents for the reactants and that they are inert under the reaction conditions. Illustrative of such solvents are sulfones such as propane sulfone, butane sulfone, pentane sulfone, and the like; alkylalkane sulfonates such as methyl methane sulfonate, ethyl methane sulfonate, butyl methanesulfonate, propyl ethane sulfonate, and the like; aromatic nitriles such as benzonitrile and the like; hydrocarbons, such as n-decane, cyclohexane, pentane, hexane, dodecane, and the like; aromatic solvents such as nitrobenzene and the like; amides such as dimethyl formamide, dimethyl thioformamide, N,N-dimethyl acetamide, N-methyl pyrrolidinone, and the like; and organosulfur compounds such as sulfolane, methyl sulfolane, dimethyl sulfone, dimethyl sulfoxide, dimethyl sulfolane, glycol sulfite, tetraetyl sulfamide and the like.

The self condensation process is carried out in the presence of a acid catalyst. Exemplary of such catalysts are Lewis Acid Friedal Crafts catalysts are for example metal halides such as boron trifluoride, aluminum chloride, ferric chloride, zinc chloride, stannic chloride and the like. The various metal halides Freidel Crafts catalyst can also be employed in the form of ether or amine complexes as for example piperidine-boron trifluoride complex, ethyl amine-boron, trifluoride complex, diethyl ether-boron trifluoride and the like. Also illustrative of useful acid catalysts are organic protonic acids such as trifluoro acetic acid, acetic acid and the like, and inorganic protonic acids such as hydrochloric acid, phosphoric acid, sulfuric acid, and the like. Illustrative of still other useful catalyst is filtrol.

The acid catalyst is employed in catalytic amounts, that is, in amounts sufficient to catalyze the self-condensation reaction to any extent. As a general rule, amount used is at least about 0.005 percent by weight base on the total weight of the reactant; however, in some applications even lower amounts may be effective. Preferably the amount of acid catalyst employed will range from about 0.05 to about 5 percent by weight based on the weight of the reactants, and more preferably will range from about 0.1 to about 2 percent by weight on the aforementioned bases.

The nucleophilic displacement condensation is carried out in the presence of a base. Useful bases may vary widely. Illustrative of useful base catalysts are organic bases such as alkali metal alkoxides as for example sodium methoxide, sodium ethoxide and the like. Exemplary of other useful bases are inorganic bases such as alkali metal hydroxides as for example sodium hydroxide, potassium hydroxide, lithium hydroxide and the like; and alkaline earth metal hydroxides such as magnesium hydroxide, calcium hydroxide, barrium hydroxide and the like.

The base is employed in an amount which is sufficient to promote the nucleophilic displacement condensation to any extent. In general, the amount of base employed is at least equivalent to the amount of bisphenol reactant. In the preferred embodiments of the invention, the amount of base is at least about 2 equivalents of base, based on the total moles of the bis-phenol reactant. In the more preferred embodiments of the invention, the amount of base is from about 2 equivalents of base to about 4 equivalents of based on the total moles of the bis-phenol reactant.

Reaction pressures are not critical and can be varied widely. For example, the process can be conveniently conducted at sub-atmospheric, atmospheric and super-atmospheric pressure. For convenience, atmospheric or autogenous pressures are employed.

Process temperatures are also not critical and can bary widely. Temperatures within the range of from about 0° C. to about 200° C. are preferred, and reaction temperatures of from about 25° C. to about 200° C. are particularly preferred. In the most preferred embodiments of this invention, reaction temperatures are from about 60° C. to about 180° C.

The processes are carried out over a period of time sufficient to produce the desired compound in adequate yield. Reaction times are influenced to a significant degree by the reactants; the reaction temperature; the concentration and choice of reactants and catalyst; the choice and concentration of reaction solvent; and by other factors known to those skilled in the art. In general, residence times can vary from about a few minutes to 24 hours or longer. In most instances, when employing preferred reaction conditions, residence times will be found to vary from a few minutes to about 3 hours.

The processes can be conducted in a batch, semicontinuous or continuous fashion. The reactants and reagents may be initially introduced into the reaction zone batchwise or they may be continuously or intermittently introduced in such zone during the course of the process. Means to introduce and/or adjust the quantity of reactants introduced, either intermittently or continuously into the reaction zone during the course of the reaction can be conveniently utilized in the process, especially to maintain the desired molar ratio of the reaction solvent, reactants and reagents. The reaction can be conducted in a single reaction zone or in a plurality of reaction zones, in series or in paralleled or it maybe conducted intermittently or continuously in an elongated tubular zone or series of such zones. The materials of construction employed should be intert to the reactants during the reaction and the fabrication of the equipment should be able to withstand the reaction temperature and pressure.

The reaction zone can be fitted with one or more internal and/or external heat exchanger(s) in order to control undue temperature fluctuations, or to prevent any possible "runaway" reaction temperatures. In preferred embodiments of the process, agitation means to vary the degree of mixing the reactions mixture can be employed. Mixing by vibration, shaking, stirring, rotation, oscillation, ultrasonic vibration or the like are all illustrative of the type of agitation means contemplated. Such means are available and well known to those skilled in the art.

The polymeric product can be isolated from the reaction mixture and purified employing conventional techniques. Illustrative of such techniques are evaporation, distillation, solvent extraction and recrystallization. The preferred technique is precipitation in a non-solvent for the polymeric product, such as water.

Reactants and reagents used in the process of this invention are readily available materials. Such materials can be conveniently prepared in accordance with conventional preparatory procedures or obtained from commercial sources.

The polymer of this invention is useful in the fabrication of a wide variety of industrial products. Shaped articles produced from the polymer of the is invention include structural parts, warehousings, door windows, apparatus castings, household equipment, components for the electrical and electronics industries, car components and semi-finished products which can be shaped by machinery. The polymers of this invention are thermoplastic materials which can be shaped into useful articles using any conventional shaping process for thermoplastic polymers such as injection, extrusions or blow molding.

The polymers of this invention are especially suitable for use in the fabrication of composites for use in the manufacture of structural parts. Such composite materials will contain fillers where the structural integrity and strength of a structure here to be maintained, and for other purposes known to those of skill in the art. Any suitable filler known to those of skill in the art can be used. Such fillers may be selected from a wide variety of organic and nonorganic materials such as polymers, minerals, metals, metal oxides siliceous materials, and metal salts. Illustrative of useful fillers are fiber glass, steel, asbestos fibers aramide, boron and carbon fillers, as well as plate like, fibrous and particulate forms of alumina, brass powder, aluminum hydrates, iron oxide, foldspar, lead oxides, asbestos, talc, barytes, calcium carbonates, clay, carbon black, quartz, novaculite and other forms of silica, dalinite, aluminum silicate betonite, garnet, mica, saponte, beidelite, calcium oxide, fused silica, calcium hydroxide, and the like. In these composites, the polymer of this invention may be blended with other thermoplastic polymers as for example polyesters, polyimides, polyamides, polysulfones, polyaramids, polyester carbonates, polyethers, polyethersulfones, polyolefins, polycarbonates, polyetherimides, polysulfides, polyacrylates, polyvinyls and the like. The foregoing recited fillers and polymers are illustrative only and are not meant to limit the scope of the fillers and polymers that can be utilized in this invention. Methods for producing reinforced and/or filled compositions and polymeric blends include melt blending, extrusion and molding processes, simple mixing and dispersion for both materials in suitable medium by methods known in the art.

The following specific examples are presented to more particularly illustrate the inventions and are not to be construed as limitations thereon:

EXAMPLE I

Bisphenol A (228 g, 1 mole) was mixed with sodium hydroxide (0.8 g, 0.02 mole) in a round bottom flask. The flask was connected to the Kugelrohr apparatus under house vacuum [(300 torr) (39.99 kPa)], and heated slowly to 250° C. in the air bath while it was gently rocked by an air operated oscillating motor to prevent bumping. At about 210° C., bisphenol started to decompose into phenol and isopropenyl phenol. Products were collected in the horizontally adjacent water-cooled bulbs. The NMR and mass spectra confirmed the structure of the products. The mixture was purified by vacuum distillation to provide 125 g of 2-isopropenyl phenol. Phenol (90 g) distilled at 60°–65° C. at 2 torr (0.2666 kPa)vacuum, whereas p-2-isopropenyl phenol was collected at 93°–95° C. at this pressure. The material was stored at 0° C.

EXAMPLE II

In 400 ml of chlorobenzene was dissolved 100 g of 2-p-isopropenylphenol (0.746 mole). To this mixture about 10 ml trifluoroacetic acid was added, followed by stirring for 2.5 hrs. at room temperature. The solution was concentrated to about 200 ml and cooled to room temperature. A total of 94 g of pure 1,1,3-trimethyl-3-(p-hydroxyphenyl)-5-indanol was collected, m.p. 202° C.

Mass spectrometry, $^1H$ and $^{13}C$ NMR confirmed the structure.

EXAMPLE III

A three neck round bottom (1000 ml) flask equipped with a stirrer, dropping funnel, thermometer, condenser, and modified Dean-Stark trap is charged with 128 gm (0.955 mol) of 2-isopropenyl phenol, 150 ml dimethyl sulfoxide (DMSO), and 200 ml toluene. After stirring and degassing with nitrogen, and when all the phenol is dissolved, 75 gm of 50 wt. % agueous sodium hydroxide solution (0.9294 mol) is added and the mixture is heated to reflux under nitrogen atmosphere. Refluxing is continued for about 3 hrs. with water removed as a water/toluene azeotrope via Dean-Stark trap. The toluene is returned to the reaction flask. When the temperature of the reaction mixture is reached about 150°–160° C., a solution of 125 gm (0.435 mol) of 4,4'-dichlorodiphenylsulfone in about 350 ml of toluene is added. Most of the toluene and additional water are removed by distillation. Once the temperature reaches 185° C., the heat is removed and the mixture is allowed to cool before it is poured into 4 liters of water after-which the suspended solids are collected by filtration.

The solid product is washed with an aqueous NaOH solution (about 5 gm of NaOH/200 ml) to remove excess phenol.

The product is collected by filtration and is washed with water to remove sodium hydroxide and on dried in vacuum to provide 205 gm. of bis[4-(2-propenyl) phenoxy]phenyl sulfone.

EXAMPLE IV

By a procedure similar to that described in Example III for bis[4-(4-(2-propenyl)phenoxy]phenyl]sulfone potassium phenate was reacted with 4,4'-dichloro benzophenone for 12 h. After repeated crystallizations from toluene-ethanol, a 50% yield of bis[4-[4-(2-propenyl)phenoxy]phenyl]ketone was obtained.

EXAMPLE V

Into a one liter resin kettle, fitted with a inert gas sparge tube, thermocouple, mechanical stirrer, dropping funnel and take-off to a fractionating column connected to a moisture trap and condenser is placed 29.90 gm (0.1114 mole) of [1,1,3-trimethyl-3-(p-hydroxy phenol)-5-indanol], 60.0 gm of dimethylsulfoxide (DMSO), and 170 gm of chlorobenzene. The mixture is heated to 60°–80° C., whereupon a clear solution is obtained. Air is displaced from the system by flushing with argon followed by addition of 0.222 mole of 50.2% aqueous sodium hydroxide (17.7563 gm) over about 10 min with stirring. Two liquid phases result: one predominantly chlorobezene, the other the disodium salt dissolved in aqueous DMSO. The system is brought to reflux with inert gas sparging into the reaction mixture. Water is removed from the system, and the chlorobezene that co-distils is returned continuously. During this procedure, the temperature of the reaction mixture rises from about 120° C. initially to 140° C. at the conclusion of this step. When this point is reached, most of the water originally present has distilled and the disodium salt of indane bisphenol appears as precipitate.

Excess azeotrope solvent is distilled from the system until the temperature of the contents reaches 155°–160° C. At this point, the precipitate will redissolve with the formation of a very viscous solution. It is believed that at this point only traces of water remain.

A 50% solution of 31.99 gm (0.1114 mole) of 4,4'-dichlorodiphenyl sulfone(DCPS) in dry chlorobenzene maintained at 110° C. is added to the reaction mixture over a period of about 10 mins. The excess solvent is distilled at a rate sufficient to maintain the temperature at about 160° C. When all the sulfone has been added, polymerization is continued for 6.5 hrs. to provide the desired polymer. The intrinsic viscosity as measured in tetrahydrofuran is 0.4, molecular weight measurement by GPC and a light scattering indicated a molecular weight of about 60,000. Tg of the polymer is 215° C.

EXAMPLE VI

In 20 ml of dried methylene chloride is dissolved 4.82 gm (0.01 mol) of bis-[4-[4-(2-propenyl)phenoxy]-phenyl]sulfone at 20° C. To the solution is added 20 ml of a 1% solution of stannic chloride in methylene chloride, followed by evaporation of the methylene chloride. The resulting oligomeric is then heated at 60° C. for 1 hr., followed by heating at 120° C. for 3 hrs. and then at 180° C. for 1 hr. to provide the desired polymer.

EXAMPLE VII

In 20 ml of dried methylene chloride is dissolved 4.82 gm (0.01 mol) bis-[4-[4-(2-propenyl) phenoxy]-phenyl]ketone at 20° C. To the solution is added some of a 1% solution of stannic chloride in methylene chloride, followed by evaporation of the methylene chloride. The resulting oligomer is then heated at 60° C. for 1 hr., followed by heating at 120° C. for 3 hrs. and then at 180° C. for 1 hr. to provide the desired polymer.

What is claimed is:

1. A polyether indane polymer having recurring units of the formula:

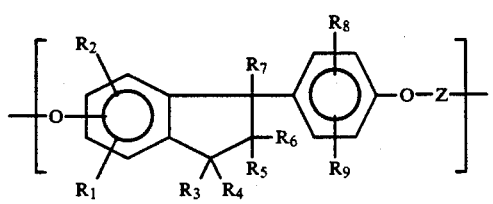

wherein:

Z is the same or different at each occurrence and is a divalent linking group which comprises one or more moieties selected from the group consisting of:

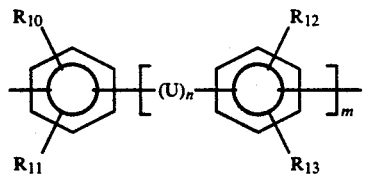 (a)

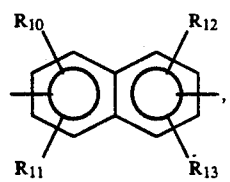 (b)

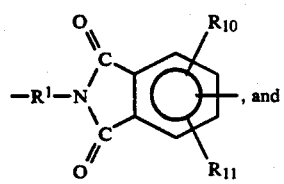 (c), and

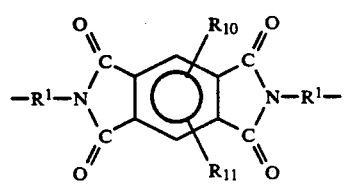 (d)

—R$^1$— is the same or different at each occurrence and is a moiety of the formula:

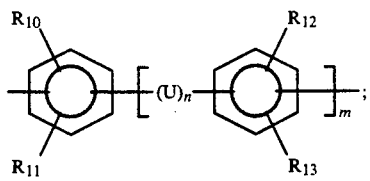

m is 0 or a whole number;
n is 0 or 1;
U is the same or different at each occurrence and is —O—, —S—, —S—S—, —SO$_2$,

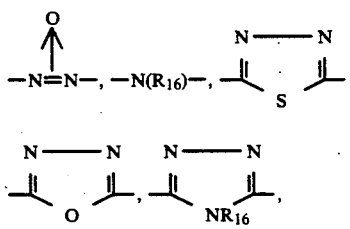

—N=N—, —N(R$_{16}$), —N(R$_{16}$)C(O)—, —C(O)N(R$_{16}$)—, —S(O)—, —C(O)—, —C(O)O—, —OC(O)— or $-\!\!\left[C(R_{14})(R_{15})\right]\!\!-$; and R$_1$, R$_2$, R$_3$, R$_4$, R$_5$, R$_6$, R$_7$, R$_8$, R$_9$, R$_{10}$, R$_{11}$, R$_{12}$, R$_{13}$, R$_{14}$ and R$_{15}$ are the same or different at each occurrence and are hydrogen, alkyl, aryl, alkoxyaryl, alkylaryl, arylalkyl, alkoxy, alkoxyalkyl, nitro, cycloalkenyl, halogen, cyano, cycloalkyl, or aryloxy; or R$_{14}$ and R$_{15}$ together may form n alkylene or alkenylene chain completing a 3, 4, 5, 6, 7, 8, or 9 membered alicyclic or aromatic fused or bridged ring system, which system may optionally include one or more divalent carbonyl, sulfonyl, oxa, aza, alkylaza or arylaza groups; and R$_{16}$ is hydrogen, alkyl or phenyl.

2. A polymer according to claim 1 wherein:
Z comprises one or more moieties of the formula:

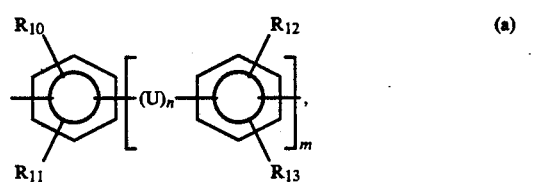 (a)

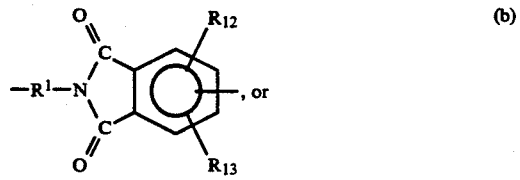 (b)

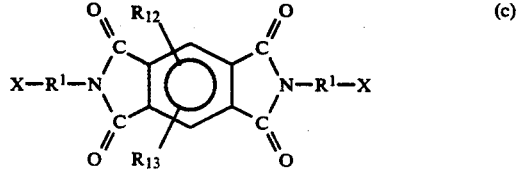 (c)

wherein:
—U— is —O—, —SO$_2$—, or $-\!\!\left[C(R_{14})(R_{15})\right]\!\!-$; and $R_{14}$ and $R_{15}$ are the same or different and are fluoro, hydrogen, alkyl, alkoxyalkyl, phenylalkyl or phenyl substituted with one or more alkyl or alkoxy groups.

3. A polymer according to claim 2 wherein:
—Z— is a moiety of the formula:

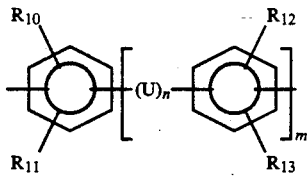

—U— is —SO$_2$— or $\dashv$C(R$_{14}$)(R$_{15}$)$\vdash$.

4. A polymer according to claim 3 wherein —U— is —SO$_2$—.

5. A polymer according to claim 1 wherein R$_1$ to R$_{15}$ are the same or different at each occurrence and are hydrogen, alkyl or alkoxy having from 1 to about 10 carbon atoms, phenyl, or alkylphneyl, alkoxyphenyl, phenylalkyl having from 7 to about 17 carbon atoms, alkoxyalkyl having from 2 to about 10 carbon atoms, nitro, halogen, cyano, cyclohexyl or phenoxy.

6. A polymer according to claim 5 wherein:
R$_3$, R$_4$ and R$_5$ are the same or different at each occurrence and are hydrogen or alkyl having from 1 to about 7 carbon atoms.

7. A polymer according to claim 6 wherein:
R$_3$, R$_4$, R$_5$ are the same or different at each occurrence and are hydrogen or alkyl having from 1 to about 4 carbon atoms.

8. A polymer according to claim 7 wherein:
R$_3$, R$_4$ and R$_5$ are the same or different at each occurrence and are hydrogen or methyl.

9. A polymer according to claim 6 wherein:
R$_1$, R$_2$, R$_6$, R$_7$, R$_8$, R$_9$, R$_{10}$, R$_{11}$, R$_{12}$, R$_{13}$, R$_{14}$ and R$_{15}$ are the same or different at each occurrence and are hydrogen or alkyl having from 1 to about 7 carbon atoms.

10. A polymer according to claim 7 wherein:
R$_1$, R$_2$, R$_3$, R$_4$, R$_5$, R$_6$, R$_7$, R$_8$, R$_9$, R$_{10}$, R$_{11}$, R$_{12}$, R$_{13}$, R$_{14}$ and R$_{15}$ are the same or different at each occurrence and are hydrogen or alkyl having from 1 to about 4 carbon atoms.

11. A polymer according to claim 1 wherein:
R$_1$ to R$_{15}$ are the same or different at each occurrence and are hydrogen, or alkyl or alkoxy each having from 1 to about 7 carbon atoms, alkoxyalkyl having from 2 to about 7 carbon atoms, phenyl, phenoxy or phenyl substituted with one or more alkyl or alkoxy substituents having from 1 to about 7 carbon atoms.

12. A polymer according to claim 11 wherein:
Z is a moiety of the formula:

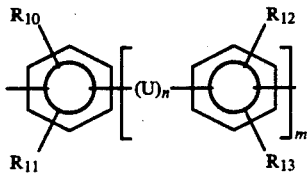

Z is —O—, —S)$_2$— or $\dashv$C(R$_{14}$R$_{15}$)$\vdash$.

13. A composition comprising one or more fibrous or particulate fillers dispersed in a polymer of claim 1.

14. An article of manufacture fabricated totally or part from the polymer of claim 1.

15. An article of manufacture fabricated totally or in part from the composition of claim 13.

16. A polymer according to claim 1 wherein:
U is the same or different at each occurrence and is —O—, —S—, —S—S—, —SO$_2$—, —SO—, —C(O)—, —C(O)O—, —OC(O) or $\dashv$C(R$_{14}$)(R$_{15}$)$\vdash$; and
R$_{14}$ and R$_{15}$ are the same or different at each occurrence and are hydrogen, alkyl, aryl, alkoxyaryl, alkylaryl, arylalkyl, alkoxy, alkoxyalkyl, nitro, cycloalkenyl, halogen, cyano, cycloalkyl, or aryloxy; or R$_{14}$ and R$_{15}$ together may form an alkylene or alkenylene chain completing a 3, 4, 5, 6, 7, 8, or 9 membered alicyclic or aromatic fused or bridged ring system, which system may optionally include one or more divalent carbonyl, sulfonyl, oxa, aza, alkylaza or arylaza groups.

17. A polymer according to claim 16 wherein:
—Z— is a moiety of the formula:

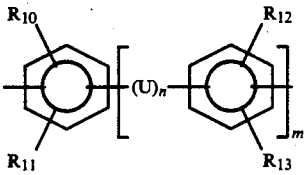

18. A polymer according to claim 17 wherein U is —SO$_2$— or —C(O)—.

19. A polymer according to claim 17 wherein:
R$_{14}$ and R$_{15}$ are the same or different and are fluoro, hydrogen, alkyl, alkoxy, alkoxyalkyl, phenylalkyl or phenyl substituted with one or more alkyl or alkoxy groups.

20. A polyether indane polymer having recurring units of the formula:

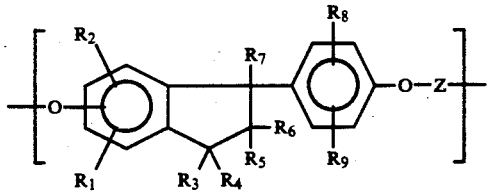

wherein:
Z is the same or different at each occurrence and is a divalent linking group which comprises one or more moieties selected from the group consisting of:

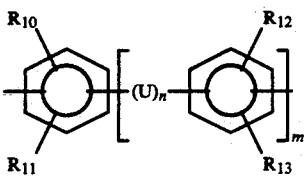

m is 0 or a whole number;
n is 0 or 1;
U is the same or different at each occurrence and is —SO$_2$— or —C(O)—; and
R$_1$, R$_2$, R$_3$, R$_4$, R$_5$, R$_6$, R$_7$, R$_8$, R$_9$, R$_{10}$, R$_{11}$, R$_{12}$ and R$_{13}$ are the same or different at each occurrence and are hydrogen, alkyl, aryl, alkoxyaryl, alkylaryl, arylalkyl, alkoxy, alkoxyalkyl, nitro, cycloalkenyl, halogen, cyano, cycloalkyl, or aryloxy.

* * * * *